US012807099B2

(12) United States Patent
Schaeuble

(10) Patent No.: US 12,807,099 B2
(45) Date of Patent: Nov. 24, 2026

(54) SPRAYING DEVICE FOR CLEANING SURFACE

(71) Applicant: Robert Bosch GmbH, Stuttgart (DE)

(72) Inventor: Michael Schaeuble, Vaihingen an der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 18/617,793

(22) Filed: Mar. 27, 2024

(65) Prior Publication Data

US 2024/0326749 A1 Oct. 3, 2024

(30) Foreign Application Priority Data

Mar. 30, 2023 (DE) ......................... 102023202904.9

(51) Int. Cl.
*B60S 1/52* (2006.01)
*B60S 1/48* (2006.01)
*B60S 1/54* (2006.01)

(52) U.S. Cl.
CPC ................. *B60S 1/52* (2013.01); *B60S 1/481* (2013.01); *B60S 1/54* (2013.01)

(58) Field of Classification Search
None
See application file for complete search history.

(56) References Cited

U.S. PATENT DOCUMENTS

2003/0047621 A1* 3/2003 Fukushima ............. B60S 1/481 239/284.1
2014/0263707 A1* 9/2014 Zernicke ............... B05B 7/0093 239/452
2018/0126406 A1* 5/2018 Galera ....................... B05B 7/26
2018/0201231 A1* 7/2018 Tani ................... G02B 27/0006
2019/0001934 A1* 1/2019 Frederick ................ B05B 1/202

FOREIGN PATENT DOCUMENTS

DE 10038810 A1 * 2/2002 .............. B60S 1/528
DE 102006061817 A1 * 6/2008 .............. B60S 1/528
EP 1970269 A2 * 9/2008 .............. B60S 1/528

* cited by examiner

*Primary Examiner* — Omair Chaudhri
(74) *Attorney, Agent, or Firm* — Michael Best & Friedrich LLP

(57) ABSTRACT

The present invention comprises a spraying device 2 for cleaning a surface 5 comprising a nozzle 21, a holding arm 22 that can move along an axis of movement 25, and a control unit 23, wherein the nozzle 21 is designed to apply a cleaning fluid 4 and/or drying fluid to the surface 5, wherein the nozzle 21 is attached to the holding arm 22, wherein the control unit 23 is configured to independently set both the position of the holding arm 22 along the axis of movement 25 and a fluid output pressure at which the cleaning fluid 4 and/or drying fluid is output from the nozzle 21.

13 Claims, 2 Drawing Sheets

SPRAYING DEVICE FOR CLEANING SURFACE

BACKGROUND

The present invention relates to a spraying device for cleaning a surface.

To enable driver assistance systems to perform their extensive tasks, a vehicle environment must be detected as completely as possible. A large number of different sensors are used in this context. However, to ensure that these sensors do not detract from the design of the vehicle, they are usually arranged behind a vehicle trim panel from the perspective of the vehicle's surroundings. These surfaces, behind which sensors are located, as well as headlights and other surfaces, require a device for cleaning dirt from the affected surfaces. Otherwise, the ability of the sensors to detect a vehicle's surroundings or the intensity of a vehicle's headlights will be reduced.

Such devices for cleaning surfaces are known from the devices for cleaning the windshield of the vehicle, or cleaning the headlights. These devices comprise at least one spraying device and one wiper. The spraying device applies a cleaning fluid to the surface, and the wiper wipes the cleaning fluid from the surface along with the dirt.

However, for aesthetic, aerodynamic or other reasons, such a device cannot be fitted at every point on the vehicle where a cleaning device is required. Therefore, there are devices which comprise only one spraying device. The spraying device is concealed and affects the design and aerodynamics of the vehicle much less than the device just explained. To clean the surface, the nozzle extends to its end position and then applies the cleaning agent to the surface.

SUMMARY

The spraying device according to the invention for cleaning a surface comprises a nozzle, a holding arm that can move along an axis of movement, and a control unit. The nozzle is designed to apply a cleaning fluid and/or a drying fluid to the surface and is attached to the holding arm. The control unit is configured to independently set both the position of the holding arm along the axis of movement and a fluid output pressure at which the cleaning fluid and/or the drying fluid is output from the nozzle. The cleaning fluid is designed in the form of a liquid and/or a gas. In particular, the drying fluid is present in a gaseous state, at least when it hits the surface.

The independent setting of the fluid output pressure and the position of the holding arm along the axis of movement makes it possible to set the position and intensity of a cleaning fluid jet and/or a drying fluid jet on the surface as required. It is thereby possible to spray different sections of the surface directly with a cleaning fluid jet and/or a drying fluid jet. Given a predefined jet shape, it follows that multiple sections are directly sprayed by an intensive region of the cleaning fluid jet, and/or the drying fluid jet and the dirt at said multiple sections are directly exposed to the intensive region of the cleaning fluid jet and/or the drying fluid jet. As a result, better cleaning of the surface can be achieved than if the cleaning fluid jet and/or the drying fluid jet were to only hit a single section of the surface. In addition, time is saved compared to conventional devices, which can only apply a liquid to the surface in a final spraying position, as the surface is already sprayed when the holding arm is extended, before a final spraying position is reached.

The dependent claims disclose preferred embodiments of the invention.

Preferably, the control unit is configured to simultaneously change the position of the holding arm and set the fluid output pressure so that the cleaning fluid and/or the drying fluid is in contact with the surface while the position of the holding arm is being changed. As a result, it is possible to sweep several sections of the surface with a cleaning fluid jet and/or drying fluid jet in contact with the surface while the holding arm is moving. This makes it possible not only to clean several discrete sections directly with the cleaning fluid jet and/or the drying fluid jet, but also to continuously clean a surface with an intensive section of the cleaning fluid jet and/or to dry it with the drying fluid jet. In discrete processes in which the cleaning fluid jet and/or the drying fluid jet first stops and then sprays a discrete section of the surface, there are intermediate sections between the discrete sections which are not cleaned at the same intensity as the discrete sections. It also saves time compared to a discrete procedure, as the nozzle can spray the sections of the surface continuously and does not have to be stopped.

The control device is particularly preferably configured to increase the fluid output pressure at an increasing distance of the nozzle from the surface. The effectiveness of the cleaning process correlates in particular with the pressure of the cleaning fluid and/or the drying fluid on the surface. The pressure of the cleaning fluid and/or the drying fluid on the surface decreases according to the distance of the nozzle from the surface at a constant fluid output pressure. By increasing the fluid output pressure at an increasing distance of the nozzle from the surface, a pressure drop of the cleaning fluid and/or the drying fluid on the surface is reduced or completely compensated. As a result, a more uniform cleaning effect can be guaranteed, in particular over the entire presence of the cleaning fluid jet and/or drying fluid on the sprayed surface. This leads to more effective cleaning of the surface.

Advantageously, the spraying device comprises a cleaning fluid line and a movement fluid line. The cleaning fluid is present in the cleaning fluid line at a fluid output pressure. A movement fluid at a movement fluid pressure is present in the movement fluid line. The cleaning fluid line is fluidically connected to the nozzle. The movement fluid line and the holding arm are configured so that the position of the holding arm can be changed by the movement fluid pressure. The control unit is configured to set the movement fluid pressure and the fluid output pressure independently of each other. The movement fluid can be a gas and/or a liquid.

As a result, it is possible to set any desired movement pattern of the holding arm and at the same time any desired cleaning pressure curve using the control unit and the separately controllable cleaning fluid line and movement fluid line. As a result, it is possible to sweep the surface multiple times in one cleaning process with a cleaning fluid jet and/or a drying fluid jet and to adjust the fluid output pressure as a function of the distance of the nozzle from the surface. Thorough cleaning and/or drying of the coated surface is achieved by repeatedly sweeping the surface with the cleaning fluid jet and/or the drying fluid jet. Furthermore, by setting the fluid output pressure and the movement fluid pressure by the control unit, it is possible to store and exchange a combination of the movement pattern of the holding arm and the spray pattern of the cleaning fluid and/or the drying fluid on the surface in the control unit as a cleaning program with little effort. Various cleaning programs can also be stored on the control unit. Providing a separate cleaning fluid line and a movement fluid line enables separate provision of the fluid output pressure and the movement pressure and simplifies control of the position of the holding arm and the fluid output pressure by the control unit.

Preferably, the control unit is configured to adjust the cleaning program as a function of the condition of the surface and/or the vehicle. As a result, the movement of the holding arm can, e.g., be adjusted so that only a section of the surface on which the dirt is located is swept by the cleaning fluid jet and/or the drying fluid jet. This makes cleaning more efficient because no clean sections of the surface are being cleaned.

Particularly advantageously, the spraying device comprises a fluid pump. The fluid pump is configured to build up the fluid output pressure and/or the movement fluid pressure. By means of the fluid pump, it is possible to build up and/or maintain a precise fluid output pressure and/or movement fluid pressure on a permanent basis.

Preferably, the spraying device comprises a further fluid pump. The fluid pump is configured to build up the fluid output pressure, and the other fluid pump is configured to build up the movement fluid pressure. As a result, a movement fluid pressure and a fluid output pressure can be set independently of each other using a simpler cleaning fluid pump than if a fluid pump would have to provide both the fluid output pressure and the movement fluid pressure. This arrangement enables a cost-effective and precise implementation of the separate setting of the fluid output pressure and the movement fluid pressure.

Alternatively, the spraying device comprises a fluid line, in which the cleaning fluid and/or the drying fluid is present at the fluid output pressure, and a valve. The valve is arranged in the fluid line and divides the fluid line into a first fluid line section and a second fluid line section. The cleaning fluid and/or the drying fluid is present in the first fluid line section at a position fluid pressure. The cleaning fluid and/or the drying fluid is present in the second fluid line section at the fluid output pressure.

The first fluid line section and the holding arm are configured so that the position of the holding arm can be changed by the position fluid pressure. The valve is configured to adjust the fluid output pressure. The control unit is configured to actuate the valve. The valve alone makes it possible to set both the fluid output pressure and the position fluid pressure. As a result, the need for a separate line for controlling the movement of the holding arm is eliminated, which not only reduces the material and component complexity, but also the size of the spraying device.

Preferably, the spraying device comprises a fluid pump. The fluid pump is configured to build up and/or reduce the position fluid pressure. The control unit is configured to set the fluid pump, and thus set a position fluid pressure. As a result, a position fluid pressure can be built up and maintained, even when spraying the cleaning fluid and/or the drying fluid through the nozzle. Since the control unit actuates both the fluid pump and the valve, the control unit is designed to set a precise movement of the holding arm and a precise fluid output pressure according to the cleaning program stored in the control unit. This simplifies the adjustment of the stored program and the execution of various cleaning programs.

The spraying device particularly preferably comprises a drying fluid line. A drying fluid is present in the drying fluid line in a gaseous state at a drying fluid pressure. The drying fluid line is fluidically connected to the nozzle. The nozzle is designed to apply the drying fluid to the surface. The cleaning fluid is present in a liquid state. The control unit is configured to set the fluid output pressure and the drying fluid pressure independently of each other. As described hereinabove, the spraying device is also intended for cleaning surfaces on which, for aesthetic or aerodynamic or other reasons, no wipers or a permanently protruding nozzle are intended to be arranged. After the cleaning fluid is sprayed on, it is not wiped off by a wiper, but carried away by the relative wind. By spraying the surface with a drying fluid, it is possible to speed up the process of removing a cleaning fluid from the surface. The accelerated removal of the cleaning fluid by spraying on the drying fluid is particularly advantageous for surfaces behind which there are sensors whose detection of the environment is impaired by the cleaning fluid on the surface.

Advantageously, the nozzle is configured to change a shape of a cleaning fluid jet of the cleaning fluid and/or a drying fluid jet of the drying fluid as a function of the fluid output pressure. The area of the cleaning fluid jet and/or the drying fluid jet is thus able to increase as the pressure increases, whereas the position of the holder arm remains constant. This enables a constant pressure per unit area in the sprayed section and increases the efficiency of the cleaning process by enlarging the sprayed section. This is especially true when the cleaning pressure is specified as a function of the surface condition. In addition, the area of the cleaning fluid jet and/or the drying fluid jet can be reduced as the pressure decreases while the holding arm remains in the same position. This enables a constant pressure per unit area in the sprayed section, even at an a decreasing fluid output pressure, and ensures that the cleaning process remains effective by reducing the size of the sprayed section.

It is particularly advantageous that the control unit is configured to set the fluid output pressure as a function of the condition of the surface. This enables a fluid output pressure adjusted to the dirt of the surface. It is thus possible to increase the fluid output pressure after detecting a higher degree of dirt. In addition, a lower fluid output pressure can be set for a lower degree of dirt. Adjusting the fluid output pressure as a function of the condition of the surface therefore enables efficient cleaning of the surface because only the fluid output pressure required for this purpose is used.

Preferably, the movement fluid line is configured to actively set a change in the position of the holding arm of the spraying device in both directions along an axis of movement. This makes it possible to actively set both a movement of the holding arm in a first direction of the axis of movement and a movement of the holding arm in a second direction of the axis of movement by means of the movement fluid pressure. This enables the position of the holding arm to be changed precisely and particularly quickly.

Alternatively, the spraying device comprises a spring. The spring is configured to change the position of the holding arm of the spraying device. As a result, it is possible to ensure that the holding arm returns to a starting position, for example in a vehicle trim panel, without the control unit actively controlling the position of the holding arm. A change in the position of the holding arm as a result of an increase in movement fluid pressure leads to compression of the spring. When the movement fluid pressure is reduced, the force on the spring decreases and the holding arm moves back to its starting position.

The invention further comprises a vehicle having a spraying device according to one of the previous embodiments. The control unit is configured to adjust the fluid output pressure as a function of the condition of the vehicle. The resulting advantages of the previous embodiments of the invention are similar.

BRIEF DESCRIPTION OF THE DRAWINGS

In the following, exemplary embodiments of the invention are described in detail with reference to the accompanying drawings. The drawings show.

DETAILED DESCRIPTION

Figure 1:
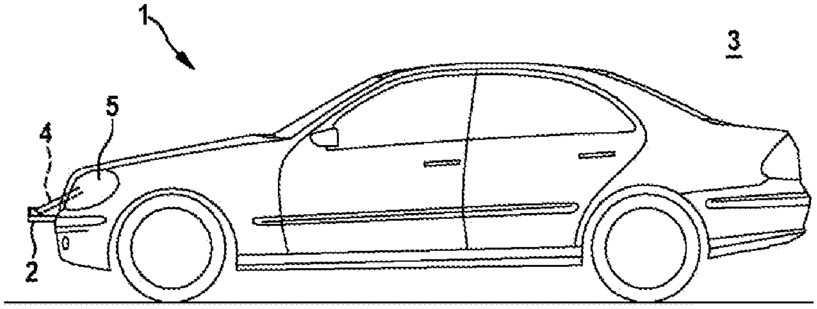
FIG. 1 a schematic representation of a vehicle comprising the spraying device according to a first exemplary embodiment of the invention, FIG. 2 a schematic representation of the spraying device according to the first exemplary embodiment of the invention, FIG. 3 a schematic representation of the spraying device according to a second exemplary embodiment of the invention, and FIG. 4 a schematic representation of the spraying device according to a third exemplary embodiment of the invention.

FIG. 1 shows a schematic representation of a vehicle 1 comprising the spraying device 2 according to a first exemplary embodiment of the invention.

The spraying device 2 is intended both for cleaning windshields on which wipers may be located and for cleaning surfaces 5 on which no wiper or permanently visible spraying device 2 are intended to be located. Such surfaces 5, as shown in FIG. 1, can be the headlights of vehicle 1. Such surfaces 5 can also be trim panel elements of the vehicle 1 that conceal a sensor. If the spraying device 2 is not required, it is located in a rest position within a trim panel element of the vehicle 1. If the surface 5 needs cleaning, the spraying device 2 moves out of the trim panel element and cleans the affected surface 5. After cleaning, the spraying device 2 retracts back into the trim panel element and is no longer visible from the outside.

Figure 2:
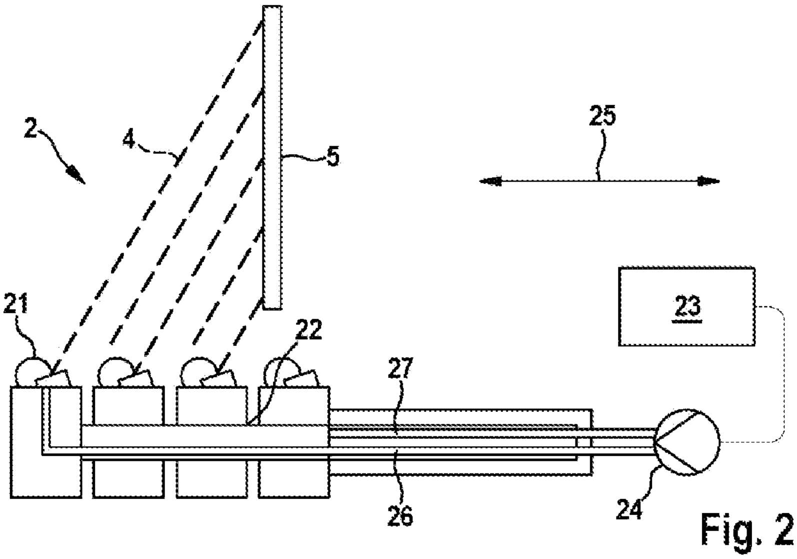

FIG. 2 shows a schematic representation of the spraying device 2 according to the first exemplary embodiment of the invention.

The spraying device 2 for cleaning the surface 5 comprises a nozzle 21, a holding arm 22 that can move along an axis of movement 25, and a control unit 23. The nozzle 21 is designed to apply a cleaning fluid 4 and/or a drying fluid to the surface 5 and is attached to the holding arm 22. The control unit 23 is configured to independently set both the position of the holding arm 22 along the axis of movement 25 and a fluid output pressure at which the cleaning fluid 4 and/or the drying fluid is output from the nozzle 21.

The independent setting of the fluid output pressure and the position of the holding arm 22 along the axis of movement 25 makes it possible to set the position and intensity of a cleaning fluid jet and/or a drying fluid jet on the surface 5 as desired. As a result, the option exists of spraying different sections of the surface 5 directly with a cleaning fluid jet and/or a drying fluid jet. Given a predefined jet shape, it follows that multiple sections are directly sprayed by an intensive region of the cleaning fluid jet and/or the drying fluid jet, and the dirt on said multiple sections is directly exposed to the intensive region of the cleaning fluid jet and/or the drying fluid jet. As a result, better cleaning of the surface 5 can be achieved than if the cleaning fluid jet and/or the drying fluid jet only hit a single section of the surface 5.

The control device is particularly preferably configured to increase the fluid output pressure with increasing distance of the nozzle 21 from the surface 5. The effectiveness of the cleaning process correlates with the pressure of the cleaning fluid 4 and/or the drying fluid on the surface 5. The pressure of the cleaning fluid 4 and/or the drying fluid on the surface 5 decreases at a constant fluid output pressure according to the distance of the nozzle 21 from the surface 5. By increasing the fluid output pressure at an increasing distance of the nozzle 21 from the surface 5, a pressure drop of the cleaning fluid 4 and/or the drying fluid on the surface 5 is reduced or completely compensated. As a result, a more uniform cleaning effect over the entire presence of the cleaning fluid 4 and/or the drying fluid on the sprayed surface 5 can be ensured. This leads to a more effective cleaning of the surface 5.

The spraying device 2 further comprises a cleaning fluid line 26 and a movement fluid line 27. The cleaning fluid 4 and/or the drying fluid is present in the cleaning fluid line 26 at a fluid output pressure. A movement fluid at a movement fluid pressure is present in the movement fluid line 27. The cleaning fluid line 26 is fluidically connected to the nozzle 21. The movement fluid line 27 and the holding arm 22 are configured such that the position of the holding arm 22 can be changed by the movement fluid pressure. The control unit 23 is configured to set the movement fluid pressure and the fluid output pressure independently of each other.

As a result, it is possible to set any desired movement pattern of the holding arm 22 and at the same time any desired cleaning pressure curve by means of the control unit 23 and the separately controllable cleaning fluid line 26 and movement fluid line 27. As a result, it is possible to sweep the surface 5 with a cleaning fluid jet and/or a drying fluid jet several times in one cleaning process and to adjust the fluid output pressure as a function of the distance of the nozzle 21 from the surface 5. Thorough cleaning of the coated surface is achieved by repeatedly sweeping over the surface with the cleaning fluid jet and/or the drying fluid jet. Furthermore, by setting the fluid output pressure and the movement fluid pressure by the control unit 23, it is possible to store and exchange a combination of the movement pattern and the spray pattern of the cleaning fluid 4 on the surface 5 in the control unit 23 as a cleaning program with little effort. Likewise, different cleaning programs can be stored on the control unit 23. The presence of a separate cleaning fluid line 26 and a movement fluid line 27 enables separate provision of the cleaning fluid pressure and the movement pressure and simplifies control of the position of the holding arm 22 and the fluid output pressure by the control unit 23.

Preferably, the control unit 23 is configured to adjust a cleaning program as a function of the condition of the surface 5 and/or the vehicle 1. As a result, the movement of the holding arm 22 can, e.g., be adjusted so that only a section of the surface 5 on which the dirt is located is swept by the cleaning fluid jet and/or the drying fluid jet. This is a more efficient cleaning method because no clean sections of surface 5 are being cleaned.

The spraying device 2 comprises a fluid pump 24 to build up the fluid output pressure and/or the movement fluid pressure. In particular, the fluid pump is designed as a compressor, fan or piezo blower. By means of the fluid pump 24, it is possible to permanently build up and/or maintain a precise fluid output pressure and/or movement fluid pressure.

In another embodiment, the spraying device 2 can comprise a further fluid pump (not shown). The fluid pump 24 is configured to build up the fluid output pressure, and the other fluid pump is configured to build up the movement fluid pressure. As a result, a movement fluid pressure and a fluid output pressure can be set independently of each other using a simpler fluid pump than if a fluid pump were to provide both the fluid output pressure and the movement fluid pressure. This arrangement enables a cost-effective and precise implementation of the separate setting of the fluid output pressure and the movement fluid pressure.

The spraying device 2 comprises a spring, which is not shown for the sake of clarity. The spring is configured to change the position of the holding arm 22 of the spraying device 2. As a result, it is possible to ensure that the holding arm 22 returns to a starting position, e.g. within a vehicle trim panel, without active control of the position of the holding arm 22 by the control unit 23. A change in the position of the holding arm 22 as a result of an increase in a movement fluid pressure leads to compression of the spring. When the movement fluid pressure is reduced, a force on the spring is reduced and the holding arm 22 moves back to an initial position.

Alternatively, the movement fluid line 27 is configured to actively set a change in the position of the holding arm 22 of the spraying device 2 in both directions along an axis of movement 25. This makes it possible to actively set both a movement of the holding arm 22 in a first direction of the axis of movement 25 and a movement of the holding arm 22 in a second direction of the axis of movement 25 by means of the movement fluid pressure. This enables the position of the holding arm 22 to be changed precisely and particularly quickly.

Figure 3:
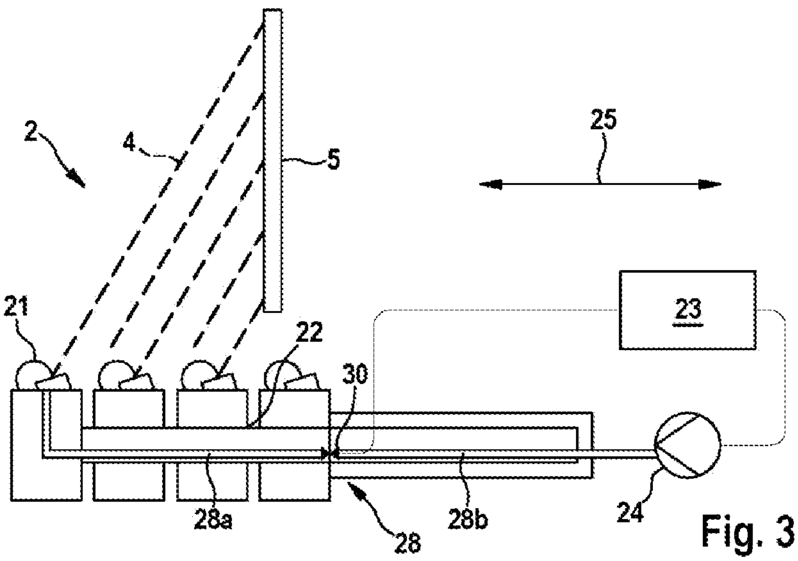

FIG. 3 shows a schematic representation of the spraying device 2 according to a second exemplary embodiment of the invention.

The spraying device 2 according to the second exemplary embodiment comprises a fluid line 28, in which the cleaning fluid 4 and/or the drying fluid is present at the fluid output pressure, and a valve 30. The valve 30 is arranged in the fluid line 28 and divides the fluid line 28 into a first fluid line section 28*a* and a second fluid line section 28*b*. In the first fluid line section 28*a*, the cleaning fluid 4 and/or the drying fluid is present at a position fluid pressure. In the second fluid line section 28*b*, the cleaning fluid 4 and/or the drying fluid is present at the fluid output pressure. The first fluid line section 28*a* and the holding arm 22 are configured such that the position of the holding arm 22 can be changed by the position fluid pressure. The valve 30 is configured to adjust the fluid output pressure. The control unit 23 is configured to actuate the valve 30. The valve 30 alone makes it possible to set both the fluid output pressure and the position fluid pressure. The need for a separate line for controlling the movement of the holding arm 22 is thereby eliminated. As a result, the material and component complexity are reduced, along with the size of the spraying device 2.

Preferably, the spraying device 2 comprises a fluid pump 24. The fluid pump 24 is set up to build up and/or reduce the position fluid pressure. The control unit 23 is configured to set the fluid pump 24 and thus set a position fluid pressure. As a result, a position fluid pressure can be built up and maintained, even when spraying the cleaning fluid 4 and/or the drying fluid through the nozzle 21. Since the control unit 23 actuates both the fluid pump 24 and the valve 30, the control unit 23 is intended to set a precise movement of the holding arm 22 and a precise fluid output pressure according to the cleaning program stored in the control unit 23. This simplifies the adjustment of the stored program and the execution of various programs.

Figure 4:
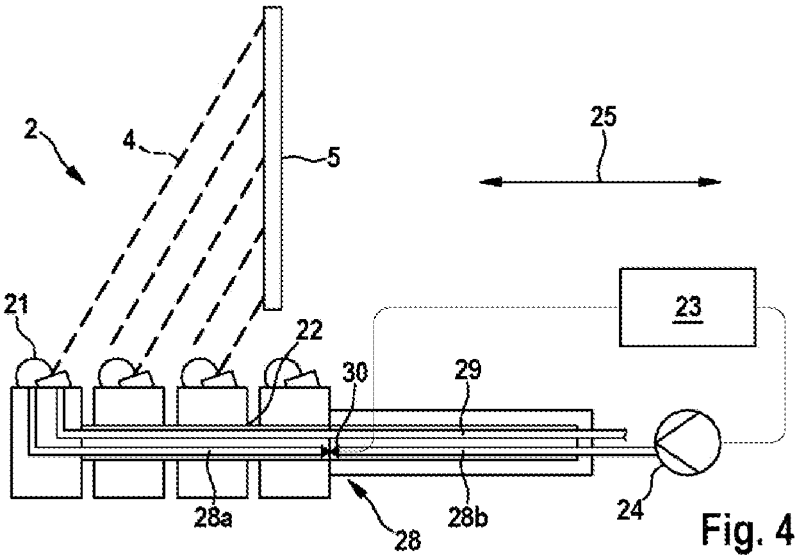

FIG. 4 shows a schematic representation of the spraying device 2 according to a third exemplary embodiment of the invention.

The spraying device 2 comprises a drying fluid line 29 in which a drying fluid is present in a gaseous state at a drying fluid pressure. The drying fluid line 29 is fluidically connected to the nozzle 21. The nozzle 21 is designed to apply the drying fluid to the surface 5. The cleaning fluid 4 is present in a liquid state. The control unit 23 is configured to set the fluid output pressure and the drying fluid pressure independently of each other.

As described hereinabove, the spraying device 2 is also intended for cleaning surfaces 5 on which no wipers or a permanently protruding nozzle 21 are intended to be arranged (for aesthetic and aerodynamic reasons). After the cleaning fluid 4 has been sprayed on, it is not wiped off by a wiper, but carried away by the relative wind. By spraying the surface 5 with a drying fluid, it is possible to accelerate the process of removing a cleaning fluid 4 from the surface 5. The accelerated removal of the cleaning fluid 4 by spraying on the drying fluid is particularly advantageous for surfaces 5 behind which there are sensors whose detection of the environment is impaired by the cleaning fluid 4 on the surface 5.

Advantageously, the nozzle 21 is configured to change a shape of the cleaning fluid jet of the cleaning fluid 4 and/or the drying fluid jet of the drying fluid as a function of the fluid output pressure. The area of the cleaning fluid jet and/or drying fluid jet can then increase as the pressure increases, whereas the position of the holder arm remains constant. This enables a constant pressure per unit area in the sprayed section and increases the efficiency of the cleaning process by enlarging the sprayed section. This is especially true when the cleaning pressure is specified as a function of the condition of the surface 5. In addition, the area of the cleaning fluid jet and/or drying fluid jet can be reduced as the pressure decreases while the position of the holding arm 22 remains the same. This enables a constant pressure per unit area in the sprayed section, even at a decreasing fluid output pressure, and ensures that the cleaning process remains effective by reducing the size of the sprayed section.

The control unit 23 is particularly advantageously configured to set the fluid output pressure as a function of a condition of the surface 5. This enables a fluid output pressure adjusted to the dirt of the surface 5. It is thus possible to increase the fluid output pressure after detecting a higher degree of dirt. In addition, a lower fluid output pressure can be set for a lower degree of dirt. Therefore, adjusting the fluid output pressure as a function of the condition of the surface 5 enables efficient cleaning of the surface 5 because only the fluid output pressure required for this purpose is able to be applied.

What is claimed is:

1. A spraying device (2) for cleaning a surface (5), comprising a nozzle (21), a holding arm (22) that can move along an axis of movement (25), and a control unit (23), wherein the nozzle (21) is designed to apply a cleaning fluid (4) and/or a drying fluid to the surface (5), wherein the nozzle (21) is attached to the holding arm (22), wherein the control unit (23) is configured to independently set both a position of the holding arm (22) along the axis of movement (25) and a fluid output pressure at which the cleaning fluid (4) and/or the drying fluid is output from the nozzle (21);

wherein the control unit (23) is configured to simultaneously change the position of the holding arm (22) and set the fluid output pressure such that the cleaning fluid (4) and/or the drying fluid is in contact with the surface (5) during the change in the position of the holding arm (22); and wherein the control unit (23) is configured to increase the fluid output pressure at an increasing distance of the nozzle (21) from the surface (5) as the holding arm (22) is moving along the axis of movement (25), so as to inhibit a pressure drop of the cleaning fluid (4) and/or the drying fluid, and so as to create a uniform cleaning effect on the surface (5) while the holding arm (22) is moving along the axis of movement (25);

wherein the spraying device (2) further includes a singular pump (24), wherein the singular pump (24) is configured to generate the fluid output pressure at which the cleaning fluid (4) and/or the drying fluid is output from the nozzle (21), and wherein the singular pump (24) is also configured to change the position of the holding arm (22).

2. The spraying device (2) according to claim 1, further including a cleaning fluid line (26) in which the cleaning fluid (4) and/or the drying fluid is present at the fluid output pressure, and a movement fluid line (27) in which a movement fluid is present at a movement fluid pressure, wherein the cleaning fluid line (26) is fluidically connected to the nozzle (21), wherein the movement fluid line (27) and the holding arm (22) are configured such that the position of the holding arm (22) can be changed by the movement fluid pressure, and wherein the control unit (23) is configured to set the movement fluid pressure and the fluid output pressure independently of one another.

3. The spraying device (2) according to claim 2, wherein the singular pump (24) is a singular fluid pump (24) and is configured to build up both the fluid output pressure and the movement fluid pressure.

4. The spraying device (2) according to claim 1, further including a fluid line (28) in which the cleaning fluid (4) and/or the drying fluid is present at the fluid output pressure, and a valve (30), wherein the valve (30) is arranged in the fluid line (28) and divides the fluid line (28) into a first fluid line section (28*a*), in which the cleaning fluid (4) and/or the drying fluid is present at a position fluid pressure, and a second fluid line section (28*b*), in which the cleaning fluid (4) and/or the drying fluid is present at the fluid output pressure, wherein the first fluid line section (28*a*) and the holding arm (22) are configured such that the position of the holding arm (22) can be changed by the position fluid pressure, wherein the valve (30) is configured to adjust the fluid output pressure, and wherein the control unit (23) is configured to actuate the valve (30).

5. The spraying device (2) according to claim 1, wherein the nozzle (21) is designed to apply a drying fluid to the surface (5), wherein the drying fluid is a gas, and wherein the control unit (23) is configured to independently set both a position of the holding arm (22) along the axis of movement (25) and a fluid output pressure at which the drying fluid is output from the nozzle (21).

6. The spraying device (2) according to claim 1, further including a drying fluid line (29) in which the drying fluid is present in a gaseous state at a drying fluid pressure, wherein the drying fluid line (29) is fluidically connected to the nozzle (21), wherein the nozzle (21) is designed to apply the drying fluid to the surface (5), wherein the cleaning fluid (4) is present in a liquid state, and wherein the control unit (23) is configured to set the fluid output pressure and the drying fluid pressure independently of one another.

7. The spraying device (2) according to claim 1, wherein the nozzle (21) is configured to change a shape of a jet of the cleaning fluid (4) and/or the drying fluid as a function of the fluid output pressure.

8. The spraying device (2) according to claim 1, wherein the control unit (23) is configured to set the fluid output pressure as a function of a condition of the surface (5).

9. A vehicle (1) comprising a spraying device (2) according to claim 1, wherein the control unit (23) is configured to adjust the fluid output pressure as a function of a condition of the vehicle (1).

10. The spraying device (2) according to claim 2, wherein the movement fluid line (27) is configured to actively set a change in the position of the holding arm (22) in both directions along the axis of movement (25), without the use of a spring.

11. The spraying device (2) according to claim 1, further comprising a spring configured to bias the holding arm (22) along the axis of movement (25).

12. The spraying device (2) according to claim 1, wherein the singular pump (24) is a fluid pump.

13. The spraying device (2) according to claim 1, wherein the position of the nozzle is configured to be set with fluid.

* * * * *